US011483989B2

(12) United States Patent
Ambrosi (10) Patent No.: US 11,483,989 B2
(45) Date of Patent: Nov. 1, 2022

(54) AUTOMATIC MODULAR SYSTEM FOR MANAGING VERTICAL FARMS

(71) Applicant: ONO EXPONENTIAL FARMING S.R.L., San Giovanni Lupatoto (IT)

(72) Inventor: Thomas Ambrosi, San Giovanni Lupatoto (IT)

(73) Assignee: ONO EXPONENTIAL FARMING S.R.L., San Giovanni Lupatoto (IT)

(*) Notice: Subject to any disclaimer, the term of this patent is extended or adjusted under 35 U.S.C. 154(b) by 134 days.

(21) Appl. No.: 16/637,490

(22) PCT Filed: Jul. 30, 2018

(86) PCT No.: PCT/IB2018/055670
§ 371 (c)(1),
(2) Date: Feb. 7, 2020

(87) PCT Pub. No.: WO2019/030606
PCT Pub. Date: Feb. 14, 2019

(65) Prior Publication Data
US 2020/0236883 A1  Jul. 30, 2020

(30) Foreign Application Priority Data

Aug. 8, 2017  (IT) .......................... 102017000092004

(51) Int. Cl.
*A01G 31/06* (2006.01)
(52) U.S. Cl.
CPC .................................... *A01G 31/06* (2013.01)
(58) Field of Classification Search
CPC ...... A01G 31/06; A01G 31/04; A01G 31/042; A01G 31/045

(Continued)

(56) References Cited

U.S. PATENT DOCUMENTS 4,476,651 A * 10/1984 Drury .................. A01G 31/042
47/65
4,486,977 A * 12/1984 Edgecombe ........... A01G 31/02
47/59 R (Continued)

FOREIGN PATENT DOCUMENTS

DE   19502177 C1 *  8/1996 ............. A01G 9/143
EP    2712499 A1     4/2014
WO  2017024353 A1   2/2017

OTHER PUBLICATIONS

International Search Report issued for PCT/IB2018/055670, dated Oct. 22, 2018.

(Continued)

*Primary Examiner* — Joshua D Huson
*Assistant Examiner* — Megan J Moroney
(74) *Attorney, Agent, or Firm* — ArentFox Schiff LLP (57) ABSTRACT

An automatic and modular system for handling trays (32) used for containing plants or the like to be grown through hydroponic, or aeroponic, or aquaponic farming, comprises a first module (30) with a quadrangular plan and a vertical arrangement delimited by respective vertical supports (31), said first module (30) comprising two lateral zones, each of which includes a plurality of substantially horizontal and overlapping supporting seats or guides (37, 37') for trays (32), and a central zone in which a vertical tray transfer device (33) operates, slidably along a vertical axis (Z) arranged on a movement means activated by motorization assemblies (34) able to translate said vertical transfer device (33) from a lowered position to a raised position for bringing itself to each tray (32) and vice versa, said vertical transfer device (33) being provided with a resting shelf (33') for a tray (32) and with a first means adapted to translate along a first horizontal axis (Y) said tray from and towards a respective seat provided inside one of said lateral zones.

(Continued)

Said first module (30) further comprises a second means (36) arranged in said central zone in which said elevator device (33) operates, adapted to take in charge a tray (32) when the latter is located on the shelf (33') of said elevator device (33) and to displace said tray (32) along a second axis (X) horizontal and orthogonal to said first horizontal axis (Y) for performing the direct transfer of said tray (32) towards a further shelf (33') of a further vertical transfer device (33) of a second module (30) arranged adjacent and connected to said first module.

18 Claims, 7 Drawing Sheets

(58) Field of Classification Search
 USPC ..................................................... 193/35 ss
 See application file for complete search history.

(56) References Cited

U.S. PATENT DOCUMENTS

| | | | | |
|---|---|---|---|---|
| 6,585,473 | B2* | 7/2003 | Turner | B65G 13/12 |
| | | | | 414/535 |
| 8,657,553 | B1* | 2/2014 | Rasmussen | B65G 7/04 |
| | | | | 414/535 |
| 9,974,252 | B2* | 5/2018 | Aykroyd | A01G 9/246 |
| 10,638,678 | B2* | 5/2020 | Collier | A01G 9/023 |
| 10,939,623 | B2* | 3/2021 | Miyahara | A01G 9/143 |
| 2012/0324788 | A1* | 12/2012 | Sakura | A01G 31/04 |
| | | | | 47/66.6 |
| 2014/0017043 | A1* | 1/2014 | Hirai | A01G 27/00 |
| | | | | 414/267 |
| 2015/0282437 | A1 | 10/2015 | Ohara et al. | |
| 2017/0027110 | A1* | 2/2017 | Ito | A01G 9/249 |
| 2017/0055461 | A1* | 3/2017 | Neuhoff, Jr | A01G 31/06 |
| 2017/0164564 | A1* | 6/2017 | Harwood | B08B 1/002 |
| 2017/0339846 | A1* | 11/2017 | Lawrence | A01G 31/06 |
| 2017/0354099 | A1* | 12/2017 | Haughton | A01G 7/045 |
| 2018/0235156 | A1* | 8/2018 | Blair | A01G 31/06 |
| 2019/0208717 | A1* | 7/2019 | Christiaens | A01G 18/62 |

OTHER PUBLICATIONS

Written Opinion of the International Searching Authority issued for PCT/IB2018/055670, dated Oct. 22, 2018 (6 pages).

* cited by examiner

AUTOMATIC MODULAR SYSTEM FOR MANAGING VERTICAL FARMS

CROSS-REFERENCE TO RELATED APPLICATIONS

This application is the U.S. National Stage Application of International Patent Application No. PCT/IB2018/055670, filed on Jul. 30, 2018, which claims priority to Italian Patent Application No. 102017000092004, filed on Aug. 8, 2017, the contents of each of which is incorporated herein by reference in its entirety.

FIELD OF APPLICATION

The present invention relates to an automatic and modular system for handling vertical farms, generally of the hydroponic or aeroponic, or aquaponic type.

More precisely, the invention relates to an automatic and modular system for handling the so-called "vertical farms" used for the soilless farming of plants. The present invention is described below with reference to a hydroponic system, which however does not exclude other methods of soilless farming that can be mentioned specifically at the time of differentiation in relation to the construction techniques that can be adopted. The system according to the invention is composed of a plurality of modular storage units with a vertical and quadrangular plan arrangement, each of which comprises a plurality of levels in which trays are arranged slidable on guides, wherein each tray can be individually collected by a movable system control and handling unit that allows the filling and collection of the plants or hydroponic farmed products contained in each tray.

The automatic and modular handling system for vertical farms according to the invention intends to solve the problems encountered using traditional vertical farms, i.e. problems deriving from the difficulties in handling a hydroponic system with crops arranged on various levels with a vertical extension inside each module.

The present invention is advantageously applied in the sector of systems for handling vertical farms used for hydroponic or aeroponic and aquaponic farming.

PRIOR ART

The recent development of so-called vertical farms is known, i.e. vertical farming based on hydroponic technology, whose prerogative is that of allowing the development of the growth of plants in special conditions, some of which are listed below:

possibility of not using soil;
exploitation of the vertical volume;
possibility of indoor farms;
up to 80% reduction in the use of water;
greater productivity;
elimination of the use of fertilizers and pesticides;
elimination of the dispersion of substances in the soil with the consequent involvement of the water table;
redevelopment of abandoned buildings;
locally grown production;
continuous farming 365 days a year, regardless of the seasons.

In general, hydroponic farming means the implementation of one of the soilless farming techniques, where soil is replaced by an inert substrate, such as expanded clay, perlite, vermiculite, coconut fibre, rock wool, zeolite, etc.), therefore also comprising the aeroponic and aquaponic techniques.

The plant is irrigated with a nutritious solution composed of water and compounds (mainly inorganic in the case of hydroponic or aeroponic, whereas they are organic or mixed in the case of aquaponic techniques) necessary for providing all the essential elements for normal mineral nutrition. The technique is otherwise known by the term water culture. Hydroponic farming allows controlled production both from a quality and hygiene/sanitary point of view throughout the whole year.

The system of hydroponic vertical farming is based on the fact that the crops are arranged on various floors or levels, with a vertical extension of the crops themselves.

The advantages are clear. Targeted production, in short timescales, allows supplies close to the user, without pesticides or chemical fertilizers, the targeted use of water and the possibility of farming all year round, even in restricted or redeveloped spaces, aside from the defence of the water table protected by the hydroponic farming system.

For these reasons, this type of farm is constantly gaining importance.

Some of these hydroponic farms are performed using sunlight, but in this case the production timescales depend on the weather, whereas in other cases systems are used with lights, generally and recently with latest generation LED technology and centralized irrigation systems distributed throughout the entire farm.

The lighting systems are designed so that the plantations receive the whole photonic spectrum they need for growth and are modulated with timescales and algorithms taken from experience and the growing times for each type of crop.

The irrigation system provides a sorting centre for sorting the nutritious fluids (water and mineral salts) that travels through the whole plantation (hundreds of metres or km of pipes) so that every plant receives its dose of nutrient. All the crops should in theory receive the same nutrition but there is no certainty that the objective is certainly reached for all the plants.

The positioning of the crops takes place with a vertical arrangement and with height limitations in the event that the harvesting has to be performed manually, whereas heights of a few metres can be reached in the event of harvesting by means of self-propelled trucks with the possibility of height adjustment.

The trays containing the products are positioned on shelves similar to those used in the storage warehouses of goods in logistics centres.

In general, hydroponic farming systems, even vertical ones, imply a reduction in water consumption, especially with closed systems that recover the nutritious solution not used by the plants and recycle it, with consequent water savings up to 80-90%, with respect to traditional farming on soil.

Furthermore, such farms lead to an efficient use of fertilizers and improved management of the plant nutrition, and there is also better control over the phytosanitary conditions: no longer being connected to the soil, the incidence of diseases that are spread by the soil and the parasites normally present in the soil are reduced, if not eliminated.

Furthermore, hydroponic farming, also the vertical type, determines the elimination of competition with weeds.

Again, soilless systems can be used efficiently in dry environments and climates, as they imply a reduction in waste and losses of water and nutrients which therefore leads to a lower environmental impact, also connected with an extremely limited use of crop protection products and weed killers.

The problem encountered with the use of traditional hydroponic farms with a vertical extension consists of the difficult handling of the crops arranged on various levels, in particular those of the higher levels, which in order to be reached require the use of ladders or, for the mechanization of the system, in some cases self-propelled means are also used, such as trucks or fork lift trucks.

The use of such equipment has also highlighted the problematic handling of the crops placed at the higher levels, as mechanized systems also do not allow the direct control and handling of the crops.

Furthermore, for farms with a vertical extension performed inside closed environments, the column elements often used are subject to height restrictions determined by the height of the floors inside the buildings in which the farms are created. The lack of modularity of known systems does not permit flexible solutions and it is often necessary to demolish floors inside buildings for the purpose of positioning column elements in determined positions.

The solutions disclosed in documents WO 2017/024353 and US 2015/0282437 are also known in the state of the art. These solutions envisage using column elements provided with different shelves on which the containers used for farming plants are arranged; however, such solutions are not of the modular type as they do not envisage the possibility of adding further mutually connectable column elements by consecutive combination from trays that should reach each shelf of each element in order to vary the positioning thereof both inside the individual elements and between one element and another.

Therefore, the absence of true modularity due to the lack of expandable structures maintaining the mutual connection, limits the possibilities of use of such systems that are manufactured with determined dimensional characteristics that cannot be further modified in the cases in which it is necessary to expand the farms.

DESCRIPTION OF THE INVENTION

The present invention sets out to develop the possibility of mechanizing and automating the hydroponic production also and especially that using structures with a vertical arrangement.

In fact, one of the objects of the invention consists of the introduction of a new system for the movement and handling of specific loading and unloading units of a hydroponic vertical farm with vertical modular elements, which will be able to exploit the same movement unit adapted to serve a plurality of modules, eliminating or drastically reducing the drawbacks highlighted above.

The invention sets out, in particular, to provide a movement and handling system for structures used for hydroponic farms, in particular those with a vertical arrangement, in which a design is not necessary but only an integration of additional standardized components that allow the expansion of the modular system itself.

Furthermore, the movement and handling system for structures used for hydroponic farms, in particular those with a vertical arrangement according to the invention allows the trays of the modules to be exchanged laterally, hence allowing the free arrangement of the various modules, being able to "design" shapes or fill the space available in the desired way.

A very important function for the movement system for handling modular structures used for hydroponic farms, in particular those with a vertical arrangement according to the invention, is the operating independence of each vertical module. In fact, in the case that transfers of shelves are in progress within the system, the elevators provided for collecting and moving the shelves themselves, which can work in parallel to the transfer activities, determine a net increase in the operating efficiency.

This is obtained through a movement and handling system for structures used for hydroponic farms, in particular those with a vertical arrangement according to the invention, whose characteristics are described in the main claim.

The dependent claims of the present solution outline advantageous embodiments of the invention.

The main advantages of the system according to the present invention relate to the possibility to use modular structures used for hydroponic farms that can remain individual or be connected in a modular way to other identical modular structures used for hydroponic farms of the same type, exploiting a modularity concept that allows the gradual growth of the system according to requirements.

Unlike other known systems, the movement and handling system for structures used for hydroponic farms according to the invention allows the occupation of the volume of the sites where they are installed to be improved.

The system according to the invention optionally allows the visual management to take place through electronic searches and with artificial viewing systems.

Furthermore, according to the invention it is envisaged that the arrangement of the modular structures used for hydroponic farms can be designed so as to fill the plan space as best as possible, generating free shapes with respect for the interfacing positions, or generating the almost complete filling of the available space, creating volumes that allow the continuous addition of modules, thus optimizing the occupied surface area.

It is also possible, thanks to the fact that the modules that comprise the system according to the invention are able to exchange the trays at any height, to provide an exchange module that allows trays to be transported inside a multi-level building, still safeguarding the continuity of the system and without requiring the removal of floors between one level of the building and the next.

By using the system according to the invention, it is possible to envisage each module being provided with limited irrigation zones, so as to avoid distribution throughout the whole system that would require very long piping.

In fact, the hydroponic farming system according to the invention envisages creating zones with modules, equipped with different types of lamps of a specific type for the emission of a particular light spectrum, allowing, thanks to the possibility of movement of the trays containing the crops, them to be subjected to different exposure cycles.

According to the invention, it is envisaged that some zones of the module may be excluded from the light radiation system so as to allow the cycle in the dark without switching off the lamps but by moving the trays into the dark zones.

This allows a saving on lighting elements.

The possibility to move the crops in trays also allows them to be spaced out, with steps of defined heights, from the radiation sources, hence being able to vary the absorption conditions.

The modules in some configurations can envisage the presence of conditioning systems for the air environment, therefore the management of parameters such as the moisture and the composition of the air.

The information system of the system according to the invention, based on neural algorithms of properties, allows a machine learning and deep learning system to be activated, i.e. smart management, which is able to gradually feed the system's database providing information on the best expected cycles or to be actuated in the case of different types of crops.

As the position of each individual plant grown is known, all the characteristics from seeding to harvest, how much it has absorbed in terms of nutrients, what light it has absorbed, etc. are known.

Therefore every plant can be controlled with total traceability.

In relation to seeding, the structure used for handling hydroponic farms with one or more individual vertical modules according to the invention can be automated whenever different types of crops are desired.

Such automation piloted by the information system allows the future product to be introduced onto the market to be traced right from the seeding step, since the allocation coordinates are known in the case of using previously implanted pods or seeding and the physical position within the system of trays inserted into the modular system, as they are unique.

This implies a drastic reduction of the hydraulic part of each system, with the possibility of differentiating the type of additives to be introduced into the supply liquid and the possibility of differentiating the quantity and the mix thereof with discrimination, even of each individual plant, considering that the coordinates are known; it will be possible during the growing time to add thereto the information related to how much water the plant with a known ID has received, the quantity of additives, the spraying frequency, etc.

The presence of one or more cameras is also envisaged, allocated in a zone of the module, that memorize the status of the plants in the trays. The information management system considers the status of each plant, compares it with previous images, with those of plants with similar characteristics (type, crop, times) and assesses its state of health.

In this way, it is possible to activate corrective actions for the growth of the plants, as well as being able to historicise different combinations of mix in the food, light exposure, times or the like, allowing variations to the growth process and continuous optimization.

All this translates into a constant source of data and images of each individual plant, and such data can be maintained until the end of the traceability of the product.

Therefore, in addition to the previous identification data of the plant, it is possible to store in the information for traceability or for the purpose of study and optimization also the light exposure times, distances, colours, therefore all the variables connected with the light exposure cycles to which they have been subjected.

The possibility is also envisaged of completely removing a determined tray containing the products for seeding purposes, the introduction of pre-planted pods, and harvesting and they can be conveyed to other destinations also through self-propelled means, such as trucks, or the like.

ILLUSTRATION OF THE DRAWINGS

Further characteristics and advantages of the invention will become apparent from reading the following description of an embodiment of the invention provided by way of non-limiting example with the aid of the figures illustrated in the appended tables of drawings, in which.

DESCRIPTION OF AN EMBODIMENT OF THE INVENTION

Figure 1:
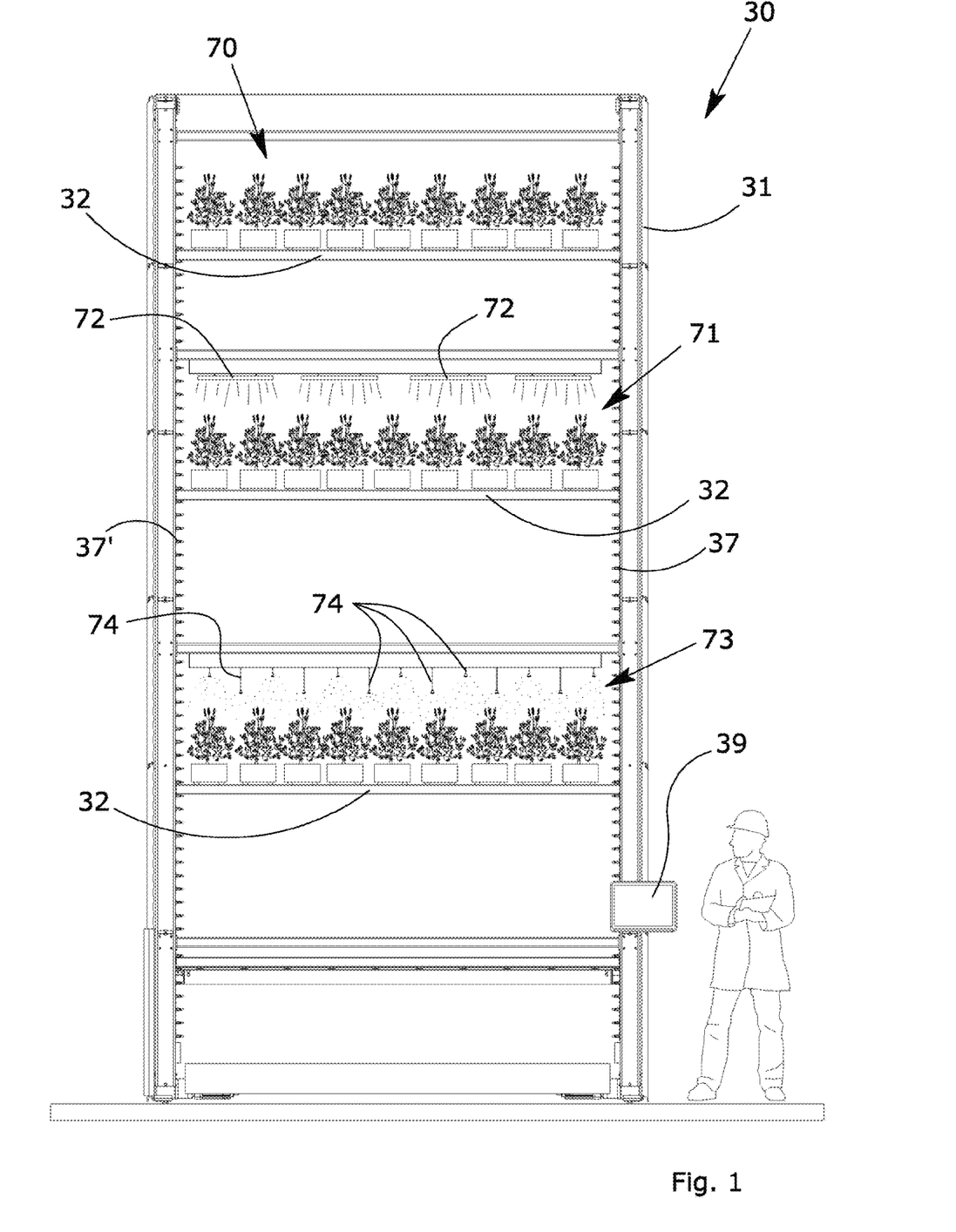
FIG. 1 is a lateral view exemplifying a module used for vertical hydroponic farming pertaining to a system according to the invention, which can be connected with further adjacent modules.
Figure 2:
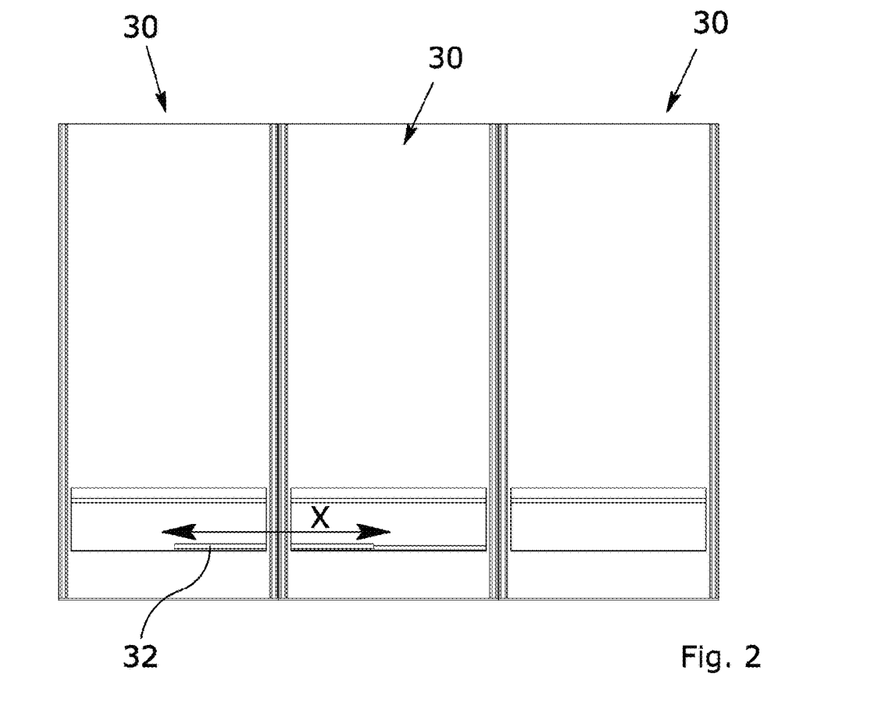
FIG. 2 is a front schematic view of an example of a hydroponic farming system with multiple adjacent modules that can be arranged according to any layout and usable as a modular logistic system according to the invention.

With reference to the appended figures, and initially in particular to FIGS. 1 and 2, 30 generally indicates an individual module of structures used for handling vertical hydroponic farms according to the invention. Said module 30 has a substantially parallelepiped shape with a vertical arrangement and quadrangular plan, comprising two flanks, opposite each other two by two supported by respective vertical supports 31, which rise starting from a lower resting plane.

Figure 3:
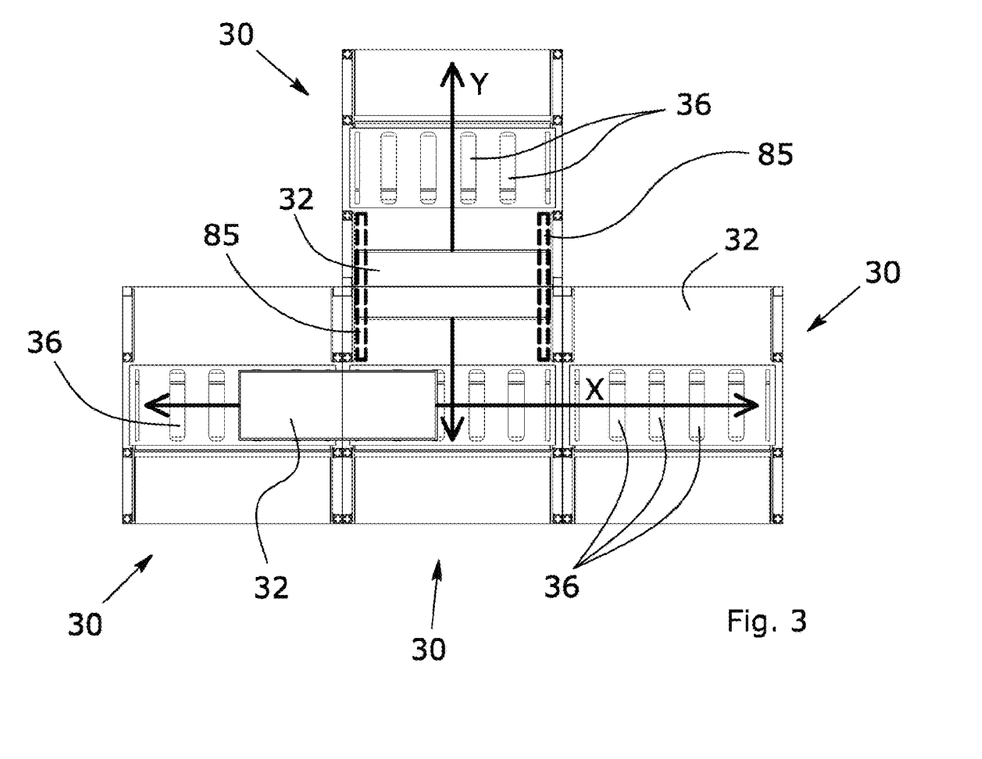
FIG. 3 represents a schematic plan view of the system according to FIG. 2.

With reference to FIGS. 2 and 3, it is envisaged that, according to the invention, a individual module 30 of structure used for the vertical handling of hydroponic farms can be placed alongside other individual adjacent modules 30, forming a network of modules with which it is possible, through internal exchange systems, to move suitable trays 32 for containing plants of hydroponic crops present in each module.

In particular, inside each individual module 30 trays 32 are present that contain the crops, which can be collected to be handled from any station and not necessarily from the module where they are contained.

Figure 4:
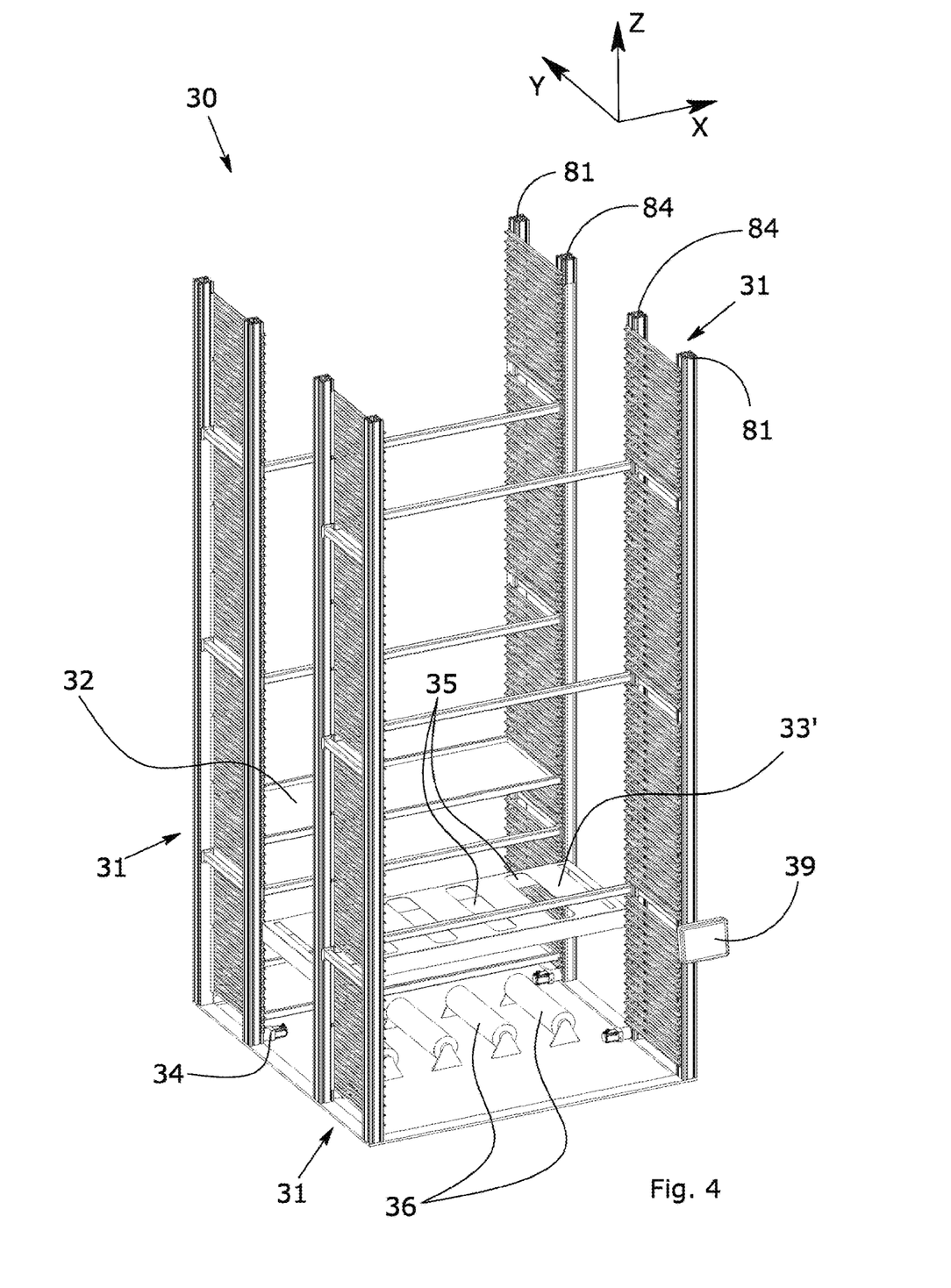
FIG. 4 illustrates a schematic, perspective and partially exploded view of a module of a hydroponic farming structure used in the handling system according to the invention.

More precisely, with reference to FIG. 4, each module 30 comprises four supports 31 comprising structural flanks with a vertical arrangement, in turn provided with seats or horizontal guides for the introduction, in the horizontal direction (axis Y in FIG. 4), of a plurality of trays 32 adapted to contain products of the hydroponic farm.

For example, such trays contain a suitable substrate on which the seeded crop can grow or on which pods can be deposited containing inert and pre-planted material arranged according to a defined geometry.

The structural flanks 31 shown in FIG. 4 that define the housing of the trays 32 are arranged two by two opposite each other, and between them a central space is defined in which a shelf 33' operates pertaining to a vertical transfer device 33 (see FIGS. 9-11) arranged on four pulley belts or chains also with a vertical arrangement and activated by means of motorization assemblies 34 able to translate the shelf 33' of the vertical transfer device 33 from a lowered position at ground level to a raised position in proximity to the upper closing panel of the module 30, and vice versa.

The four pulley belts or chains that allow the movement of the shelf of the vertical transfer device 33 are arranged along the internal vertical edges of each structural flank 31 for supporting trays 32, i.e. they face towards the central compartment in which the shelf 33' of the vertical transfer device shelf 33 itself operates. Said vertical transfer device 33 travels along the inside of the structure of the module reducing the space occupied by the movement system. In this way, the space for the lateral transfer of the trays 32 is free.

Therefore, as can be clearly seen in the figures, the base module of the system according to the invention, is comprised of a column with a parallelepiped shape and comprising three distinct zones, of which a central one for the movement of the shelf of the vertical transfer device 33 and two lateral ones, respectively on one side and the other of the central zone, provided with resting means for the trays 32 containing the hydroponic crops.

According to one embodiment the shelf 33' of the vertical transfer device 33 is further provided with a plurality of openings 35 adapted to be intercepted by an exchange device comprising respective motorized rollers 36 which, in operation, face the inside of the shelf 33' of the vertical transfer device 33 exceeding in height the horizontal surface of the shelf 33' itself.

This device allows the vertical transfer device 33 to be able to reach each tray 32 which can be collected from its housing, loaded onto the vertical transfer device and displaced until reaching any level of the module.

When a tray 32 is collected by the vertical transfer device and guided to the motorized rollers 36, the latter cross the openings 35 of the tray 33' of the vertical transfer device, take in charge the tray 32 and translate it horizontally towards an adjacent module provided with analogous motorized rollers until depositing it on the shelf of the vertical transfer device of the adjacent module.

In relation to the transfer of trays 32 between the central zone of the module 30 and one of the lateral zones in order to be able to be arranged in their own seats or collected therefrom, the vertical transfer device is provided with a horizontal mechanical transfer means for transferring the trays according to the Y axis indicated in the figures, which are well known in the state of the art and that will not be further described herein.

Whenever various modules are present adjacent to each other, it is not necessary for all the modules to have their own vertical transfer device at the same height, but only the starting module and the arrival module must have the same height of vertical transfer device. The intermediate modules can therefore activate appropriate translation assemblies when engaged by the module that precedes them in the delivery direction.

Figure 5:
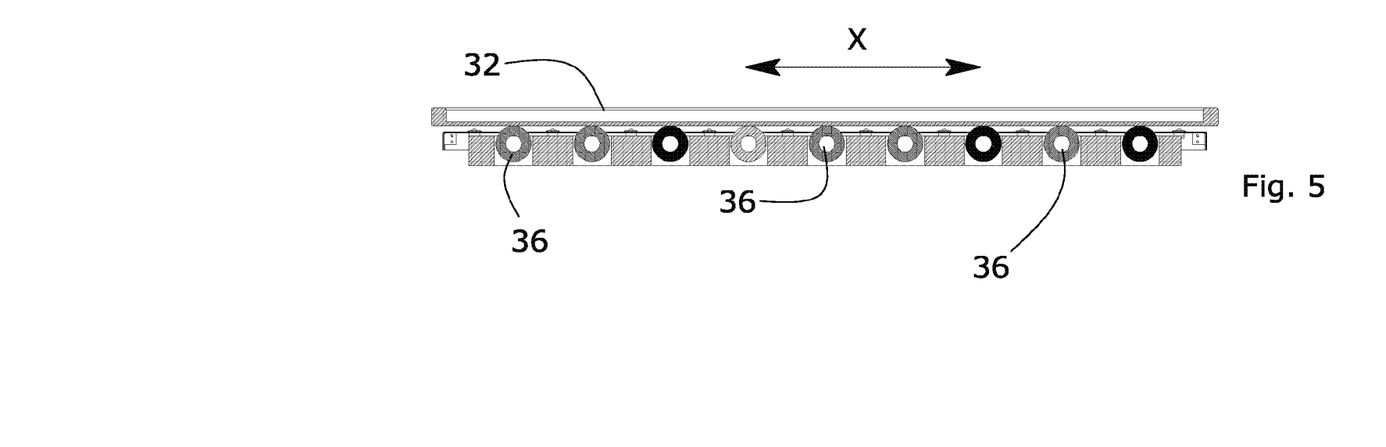
FIGS. 5 and 6 represent, in lateral and schematic perspective views respectively, a system for pulling trays along the axis X cooperating with an elevator device pertaining to a module according to the present invention.
Figure 8:
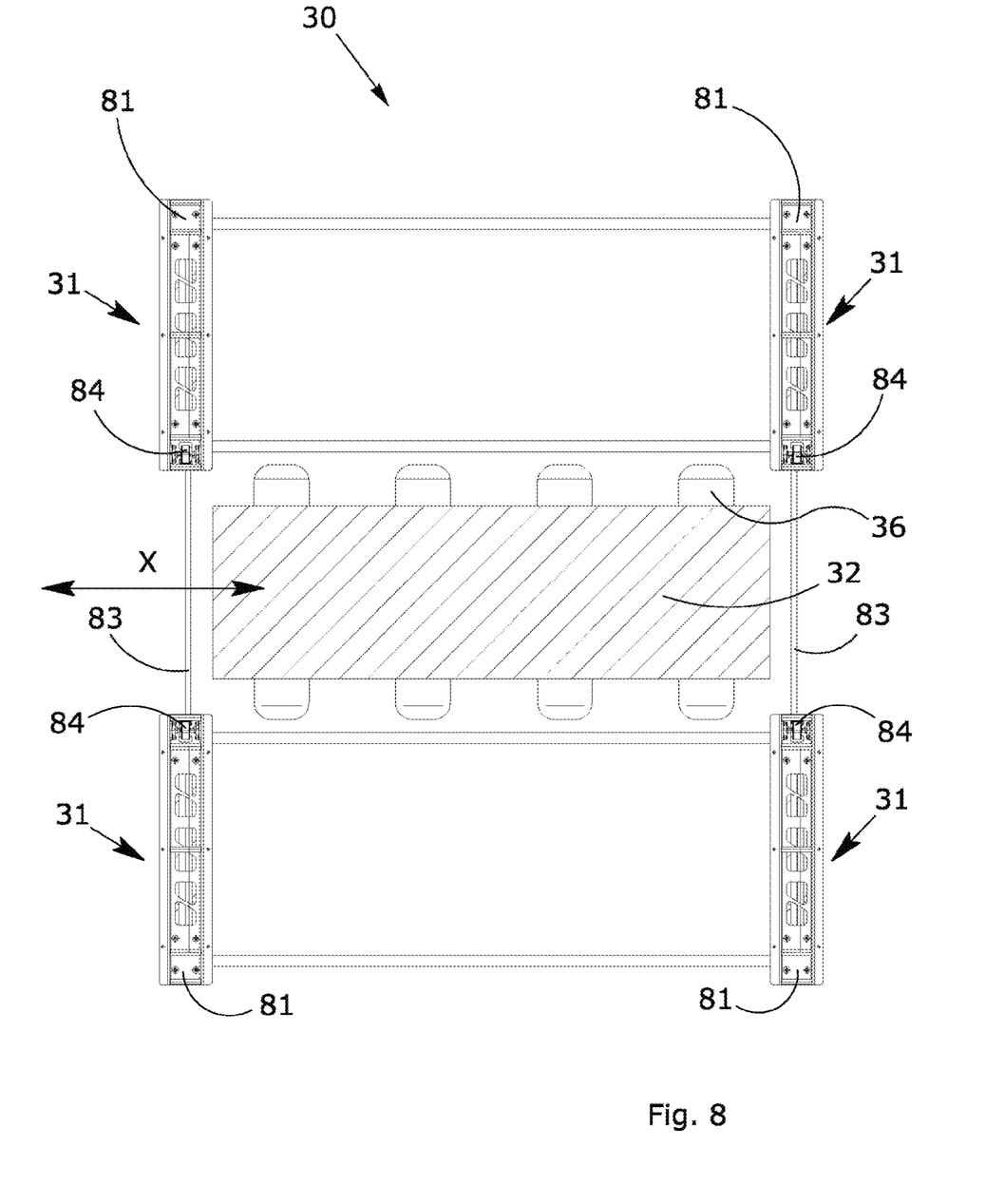
FIG. 8 shows a plan view that highlights the configuration of the supports that have been joined with crosspieces to form a module.

As illustrated in FIGS. 5 and 8, each module comprises four supports 31 comprising structural flanks, each of which is composed of pairs of vertical metal profiles 81 connected to each other by structural crosspieces.

In the central zone afforded between the four supports 31, the vertical transfer device 33 operates, which determines the vertical displacement of the trays 32 (axis Z in FIG. 4).

For the movement of the vertical transfer device 33 at at least one of the profiles 81, a kinematic means 84 (see FIG. 8) is arranged for moving the vertical transfer device arranged in the central part of the module 30 between the supports 31.

As represented in FIG. 8, the supports 31 are joined together initially two by two with crosspieces 83, as well as struts or structural tie rods so as to constitute a set of shelves in which said supports are load-bearing, and carry on the same side the kinematics for the movement of the vertical transfer device 33 with belts or pulleys with the arrangement towards the inside of each support 31.

Therefore two frames are obtained, each of which is composed by the joining of two supports or structural flanks 31 which, placed opposite each other with the belts or chains that face each other two by two and spaced out with other structural elements, allow the realization of the structural skeleton of the module 30. According to a preferential embodiment of the invention, the module 30 has a square plan, where each side has the same length, and is split into three internal zones with a substantially identical width, wherein the central zone is intended for the movement of the vertical transfer device and the two lateral zones for the arrangement of the trays 32.

According to this embodiment, wherein the module 30 has a square plan shape, the modules 30 can be flanked and connected to each other in a repeated and modular way infinitely.

A simplified implementation of the system allows two supports 31 of the same side of the module 30 to be connected with a motion transmission shaft controlled by a single motor possibly with an associated motion reducer. This implementation allows a reduction in the costs of the mechanics.

Unlike what is envisaged by the prior art, each module 30 is completely independent and does not necessarily depend on the others as it is provided with its own vertical transfer device 33 which makes it independent.

In a system comprising a plurality of modules, according to the present invention, each module 30 is seen separately from the others, and thanks to the transferability of the trays can be handled in a totally differentiated way. It is not a single system but a cellular system where on a case-by-case basis the information management system elects a "leader" module that supervises the general management.

This ensures that in the case of malfunctioning of one of the modules 30 the others connected in the network do not stop their activities, drastically reducing the costs of maintenance and downtime.

Figure 9:
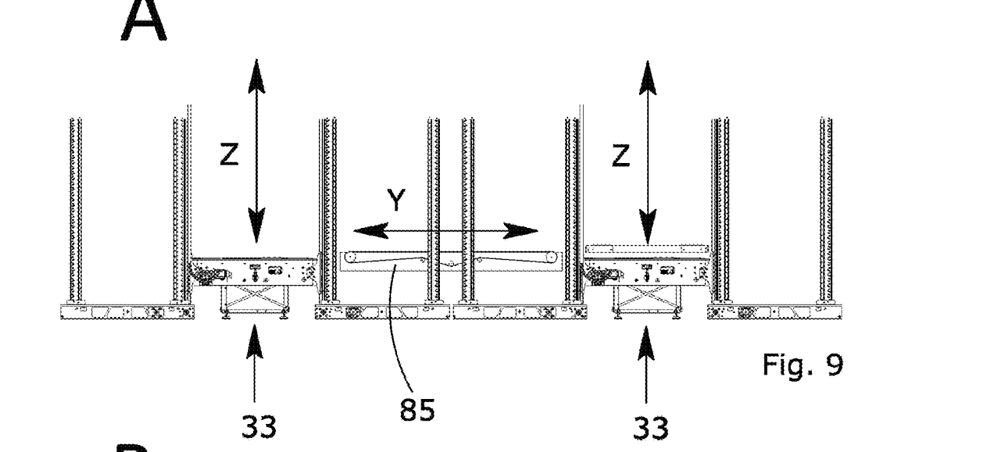
FIGS. 9 to 11 represent a pair of laterally joined modules provided with a device for the lateral transfer of trays along the Y axis and vertical along the Z axis.
Figure 10:
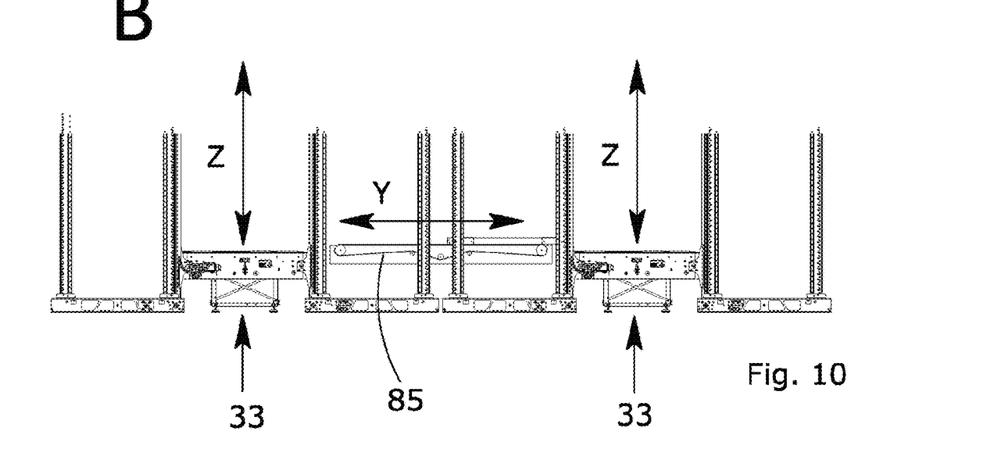
Figure 11:
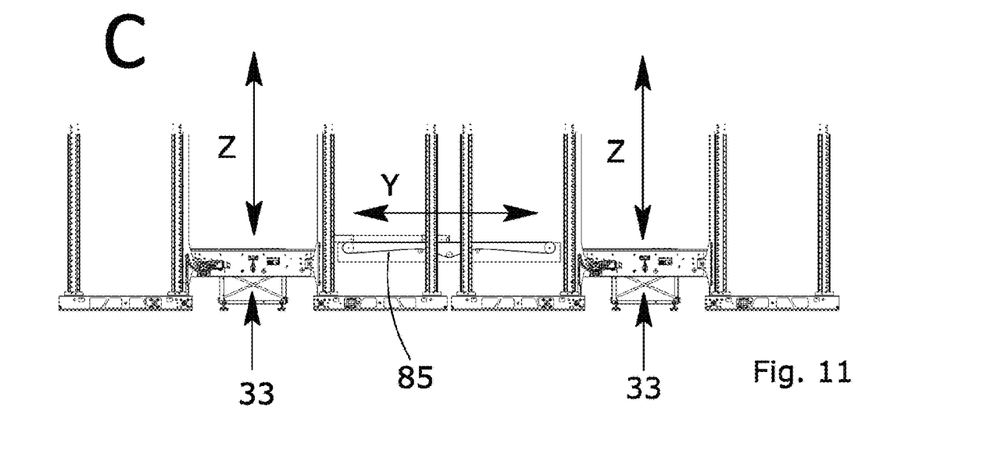

According to a preferential embodiment, the vertical transfer device 33 is composed of two coordinated movement elements with 2 or 4 separate motors, which allows the space to be left free inside the system so as to be able to house a longitudinal translation system from one module to another, as illustrated in FIGS. 9 to 11, in which it is possible to recognize a horizontal transfer device 85 (Y axis) arranged between two adjacent modules, which allows tray 32 to be directly transferred from one module to another module connected thereto. In the embodiment illustrated in FIGS. 9 to 11, the horizontal tray transfer device 85 is arranged in the lower part of the adjacent modules. However, it is clear that said device 85 can be arranged at any height, based on the design requirements, in which the passage of trays 32 is desired from one module to another.

This characteristic appears to be usable with great advantage in the case in which a module is structured so as to allow the vertical transfer of trays between two levels of a building. In this case, a horizontal tray transfer device 85 between adjacent modules can be arranged at the upper level, therefore allowing the trays to be transferred directly from a lower level to an upper level without interrupting the physical continuity of the system, which is not envisaged by any solution known in the state of the art.

Therefore unlike other constructional embodiments the mechanics studied allows the passage between modules to be left free, hence not having any obstructions in the lateral exchange zone.

Each module may be completely closed with vertical panel walls which may have different characteristics and functions. They can be configured with quadrangular shaped panels or however geometrically repeatable, comprising panels that can be arranged in a totally free way, according to the type of system to implement, having the following possible non-exclusive characteristics:

Simple closure for limiting the invasion of any contaminants;
Transparent made of plastic or glass materials to allow the passage of light;
Insulating so as to thermally insulate the module;
Radiating so as to allow heating zones inside the module;
Light radiating with LED light or other lighting devices;
With fans for circulating air;
With the release of gases or products or nutrients for farming;

The two lateral zones opposite the central zone occupied by the vertical transfer device 33 have resting ledges in the shape of fins 37, 37' (see FIG. 1) for the trays 32 containing the crops. The information system envisaged for farming purposes envisages the smart management of the movement of the trays 32 containing the crops, allowing the positioning thereof at free and non-restricting heights.

As well as the trays 32 containing the crops, the panels that carry the lighting systems (LED) are also positionable freely with the automated system, therefore allowing the general arrangement of each module 30 to be re-configured also by moving the lamps.

Having installed the lamps movable in the modules, the trays 32 can be configured with LED diodes with light emission specialization (determined wavelength, specific for plants).

The plants need different types of lighting, during the photosynthesis cycle; LED tubes or current systems envisage the identification of "medium" light emission (white or purple light), or have all the possibilities to emit in a single emission system with all the different types of LED assembled with different types of emission.

Being able to move the drawers with the crops, it is thus possible to expose them to specialized light (e.g. only far red etc.) and sequentialise the position thereof and the exposure time and therefore reduce the cost of the light system being able to install only specific components (LED diode) in the panels.

Thanks to the fact that the trays 32 can be moved in defined steps by the software it is possible to optimize the distance of the crop from the light source. By way of example, this capacity allows the trays containing the first shoots to be moved closer to the source and therefore to reduce the electrical power input to the lighting system, obtaining the same energy transfer effect to the leaf. In fact, in common cases the positioning distance of the trays from the lighting system is determined in a space that allows the plant to grow over time, to obtain the obtainable result thanks to the system according to the present invention systems known in the state of the art must be configured to emit maximum power from the first day, illuminating for a long time what in actual fact would not require any light, i.e. the growing plane whether it is in soil or inert material where only small receptive leaves are present (at least in the early growth phase).

As the plant grows the system having growth analysis sensors provides information to the software management system to decide at what distance to position the trays 32 in the subsequent steps, as well as providing exposure/time adjustments (times and type of emission) to the light sources. This system is strongly adaptive according to the growth of the plants and also the variation of the species grown. The system described herein allows different species to be farmed in the same system having total control of the growth thereof.

The possibility of moving the trays also helps with the possibility to inspect the product at any time without risk to human safety.

The system according to the invention allows modules to be configured in a differentiated way that allow the system to be isolated within hostile environments, or zones to be handled with differentiated microclimates in order to be able to handle the growth of the products in a precise way.

An important step of the growing process is germination; this step generally with greater farming intensity is normally performed in different zones. Thanks to the mobility of the trays and the possibility to create dedicated zones, it is possible to position germination modules with controlled temperatures in order to accelerate also this step while keeping it under control.

Each connected module can therefore receive and see the transit of trays with crops coming from other modules, having different characteristics. Each module does not necessarily have to have all the functions previously indicated. It is sufficient for some of these to be present on at least one or some of them according to the loading activity to be performed. The modularity consists of the fact that at any time in the life of the system it is possible to change the configuration of the modules without expensive interventions. For example, the irrigation zone may be present on one module only, the lamps may be moved into different configurations, side panels can be added or replaced with others having different functions.

Thanks to the total modularity of the system's components, it is possible to arrange the nutrient mixing zone in proximity to the irrigation zone. This allows the nutrient mixes to be kept precisely under control according to the type of plant and the state of growth.

The system according to the present invention has the peculiarity of being able to be used either as a structure for handling hydroponic farms with an individual vertical module or, by installing more modules arranged according to any layout, it can be used as an integrated modular logistic system that can exchange the trays 32 by means of the vertical transfer device 33 with which each module is equipped.

Therefore, by means of a panel equipped with a human machine interface (HMI) 39 (see FIGS. 1 and 4) or remotely through another information apparatus, the operator can recall a tray 32 used for hydroponic farming from any position, without necessarily operating from the module where the desired item is physically located.

Figure 6:
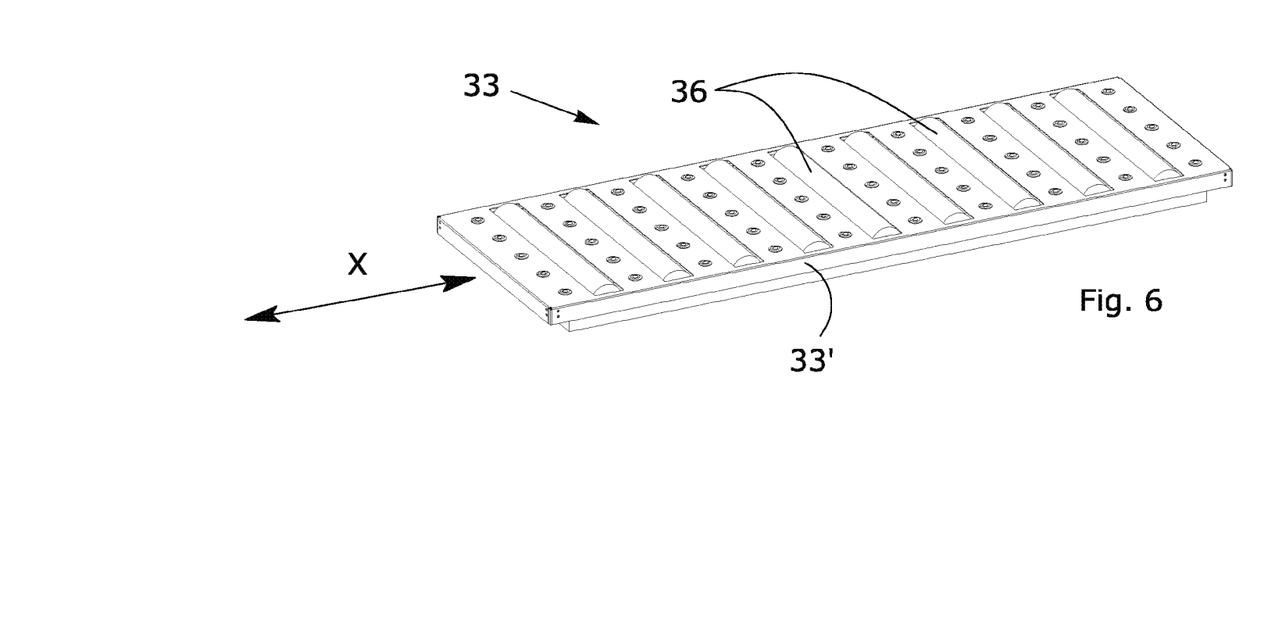
Figure 7:
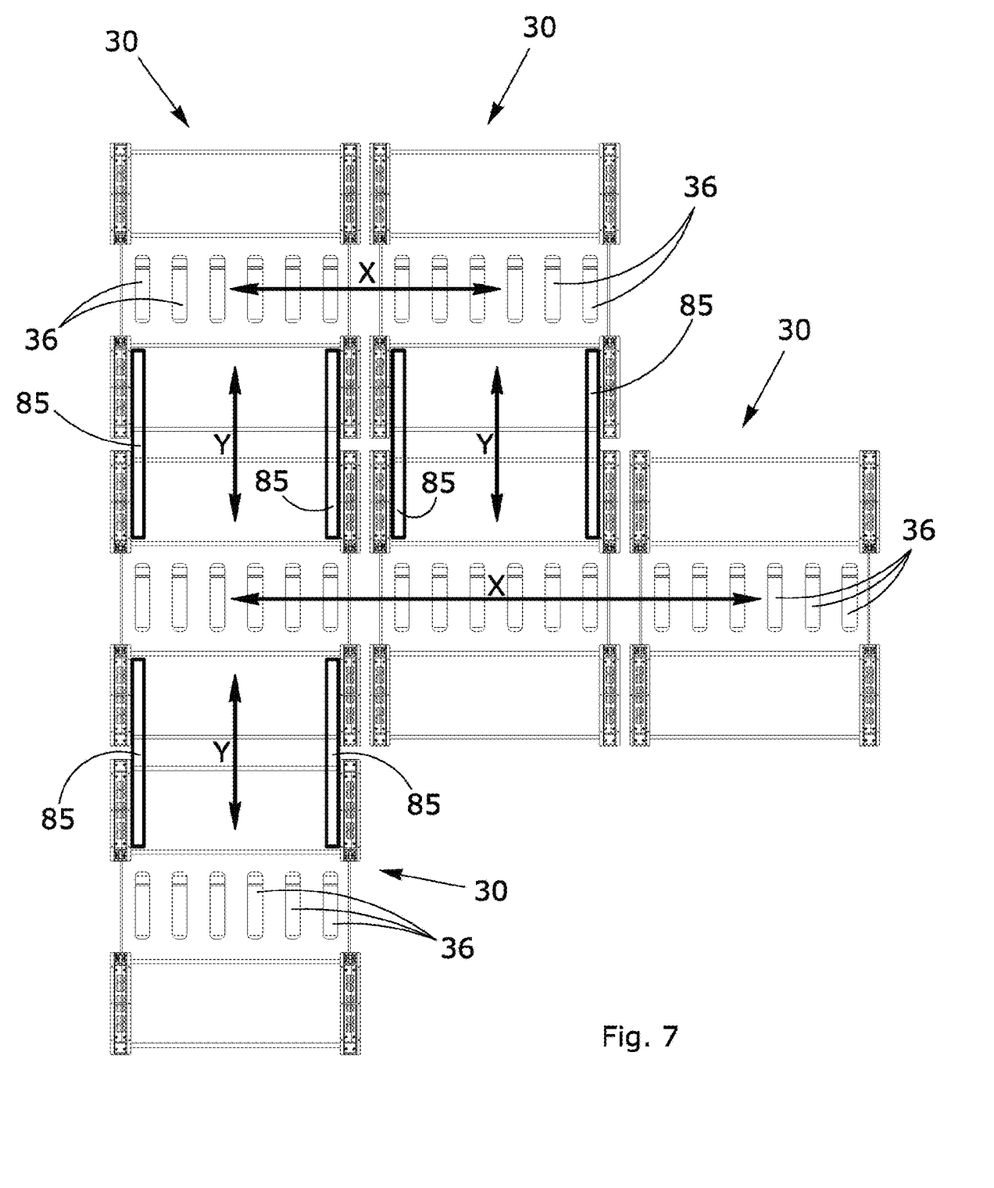
FIG. 7 is a schematic plan view of a possible system configuration for the automatic handling of soilless crops according to the present invention.

Therefore, from any farming module the operator recalls a tray containing a crop and the software system allows the module in which the shelf to be handled is located to be identified so that, by means of the motorization, the vertical transfer device 33 is brought to the correct height, the relevant tray 32 is collected, and by lowering itself to the level proximal to the ground the lifting of the tray by the elevator is activated by means of rollers 36 (see FIG. 5-6).

Subsequently, the synchronized rotation of the rollers 36 allows the displacement in one direction or the other of the tray so that it can be displaced laterally towards the adjacent individual structure module.

The adjacent individual structure module in turn, with the elevator in the ground position, if it is the final destination, activates the rollers that turn in synchrony, and is able to receive the tray in the exchange step coming from the adjacent module and allow the passage should the destination module be another one.

The electronic control and management part is located inside the electric module generally placed in the lower part of the loading and unloading zone, and can be managed by a control panel allowing access to the electric panel in all cases of arrangement of the modules.

The displacement of the tray to the front, i.e. orthogonally with respect to the lateral displacement direction imparted by the rollers 36 previously described, is obtained through the use of a horizontal tray transfer device 85, which remains sustained by load-bearing elements which support the tray 32 itself while the rollers 36 are lowered and in a non-operating condition so as not to interfere during the frontal movement.

Such device 85 is optional and is installed at the modules 30 in which it is necessary to directly transfer the trays from one position to another. As mentioned above, the horizontal tray transfer device 85 can be installed at any height and generally comprises a pair of motorized belts acting at two adjacent lateral zones of two adjacent modules. Through said motorized belts a tray 32 can be transferred directly from a lateral zone of a given module to a corresponding lateral zone of an adjacent module, without requiring the intervention of any vertical transfer device 33.

Each module which, together with other modules, composes the modular system for handling hydroponic products according to the invention, comprises the same devices described above being part of each vertical transfer device 33 which can be positioned at the same height, by performing appropriately programmed movements in order to receive in synchrony the moving tray and place it at the centre of the vertical transfer device 33 so that it can be displaced into the programmed location for the loading or collecting of the components housed therein.

The information system integrated into each of the modules envisages a redundancy of databases regarding the whole system (with any limitations if required by the system administrator) so that, in the event of failure of any of the electronic apparatuses on-board one of the modules, there is a backup copy of the data.

The application of such system to the handling of vertical hydroponic crops offers numerous advantages for health and for the economy in addition to those deriving from the possibility to completely automate the process from the seeding step or the positioning of pods pre-planted with specific seed to the harvesting step.

The trays containing the inert material that allows the budding and growth of the plants can be moved within the system thanks to the automated displacement system.

For each module it is possible to define optional areas with different degrees of impact on the useful volume that allow, in a concentrated and no longer completely distributed way throughout the system, the following:

seeding various types of plants with a robotized system or manually;

positioning pods pre-planted with specific seed with a robotized system or manually;

bringing food to the plants in a precise way through a sprinkler, drip, injection or release irrigation system or through a robot;

storing images that can be subsequently analyzed by the information system;

bringing the necessary light to the plant growth step (activation of photosynthesis);

environmental comfort, moisture, oxygenation, air flow, temperature;

providing a zone where the operator has access for taking samples and checking the crops being grown.

With reference again to FIG. 1, it can be noted that each module can be split into various overlapping zones, each of which provides for different functions.

Even if the order of the arrangement may be different, it is possible for example to note from FIG. 1 that the highest zone indicated with number 70 is free from lighting, appropriately shielded and free from water conduits, therefore it represents a dark zone in which the crops are inserted for simulating night-time.

This allows cycles to be performed in the dark in this zone that is excluded from light radiation therefore without the need to switch off (and subsequently switch on) the lamps but by appropriately moving the trays into such dark zones.

Below the dark zone 70 a zone 71 is afforded which is dedicated to LED lighting means 72 in which the trays containing the crops are inserted for simulating daytime and solar radiation.

In the lowest shelf an irrigation zone 73 is afforded, in which the conduits 74 are inserted which end in numerous nozzles or different irrigation systems. The conduits in the irrigation zone come from a suitable water source containing nutritious substances and any inhibitors that safeguard the crop from the most common pathogenic agents, or in the case of aquaponic farming from appropriately filtered fish farming tanks.

The arrangement mentioned by way of example may be diversified as preferred or according to different requirements that also depend on the various types of crop.

More generally, in relation to seeding or the positioning of pre-planted pods, the structure used for handling hydroponic farms with one or more individual vertical modules according to the invention can be automated whenever different types of crops are desired.

Such automation piloted by the information system allows the future product to be introduced onto the market to be traced right from the seeding step, since the seeding or pod positioning coordinates in the individual tray are known and the physical position within the system of trays inserted into the modular system, as they are unique.

By way of example, the initial data available could be: plant ID, type of implanted seed, inert material, seeding coordinates or positioning of the pods in the tray XY, tray ID, seeding time, etc.

Furthermore, unlike the current systems where bulky sorting centres are present for sorting the nutritious substances to be added to the water and to be brought to the growing plants, it is possible to identify a zone in each module or rationalize the number thereof based on the conformation of the system or the frequency of use thereof. The trays containing the inert material, the seed planted in the pod or the already sprouted plant, can be moved to the spraying zone, which in the diagram of FIG. 1 is indicated with the number 73.

This implies a drastic reduction of the hydraulic part of each system, with the possibility of differentiating the type of additives to be introduced into the supply liquid and even the possibility of differentiating the quantity and the mix thereof with discrimination of each individual plant, considering that the coordinates are known; it will be possible during the growing time to add thereto the information related to how much water the plant with a known ID has received, the quantity of additives, the spraying frequency, etc.

The presence of one or more cameras is also envisaged, allocated in a zone of the module, that memorize the status of the plants in the trays. The farm's information management system considers the status of each plant, compares it with previous images, with those of plants with similar characteristics (type, crop, times) and assesses its state of health.

In this way, it is possible to activate corrective actions for the growth of the plants, as well as being able to historicise different combinations of mix in the food, light exposure, times or the like, allowing variations to the growth process and continuous optimization.

All this translates into a constant source of data and images of each individual plant, and such data can be maintained until the end of the traceability of the product.

In relation to lighting in current indoor hydroponic farms, lighting systems are provided that supply specific light to the plantations, hence activating photosynthesis. In fact, each type of plant reacts differently according to the type of light that hits it.

Unlike plantations on soil or in greenhouses that can necessarily be seasonal and that are subject to the whole light spectrum that the sun provides, in the case of closed farms there is a possibility of illuminating the plants with specific portions of the spectrum, mixed with different intensities from each other. A further variable is the quantity of photons that can and must be supplied to the plant for optimal growth. In current vertical farms the distance of the lamps is generally fixed, as well as for the plumbing installation, and the size of the lighting system must necessarily be large.

In the case of the system according to the invention, some of the techniques that can become limitations as described above, can be managed in an optimal way.

For example, the types of light can be concentrated in a single lamp or differentiated by zones, therefore with different types of LED according to the zone, having the possibility to move the trays with the products growing it will be possible to allocate the plants in positions where they can receive the type of light necessary at that given time of their growth, while other plants can occupy the zone just left free by them.

The dark cycle, being obtainable by moving the container of plants, will allow a lower number of light emitters to be adopted that will not be switched off and unused but kept on and allocated only in the positions where their function is required.

This technique could allow smaller lighting systems to be installed and the rationalization of the types of lamps to be used and their quantity. The variable "distance" from the light source is in this case manageable. In fact, each tray can be positioned with height step discriminants that allow variable distances.

The information and management system according to the invention can consider the necessary distances, the type of light to be used on a case-by-case basis using for its decisions the information deriving from the images stored for the individual plant.

Therefore, in addition to the previous identification data of the plant, it is possible to store the information for traceability or for the purpose of study and optimization also the exposure times, distances, colours, therefore all the variables connected with the light exposure cycles to which they have been subjected.

According to further embodiments of the invention sensors and active elements can be installed on each module that allow the correct growing environment to be created for one or more determined types of plantations.

The application of the system according to the invention to the handling of vertical hydroponic farms also points towards humidification or dehumidification of the air, a supply of oxygen or $CO_2$ or other gaseous mixtures, heating or cooling which may be cyclic or not of the environment, heating of the tray, etc. All this information can also be stored for optimization, study and traceability purposes.

According to the size of the system, zones can be provided that are generally known as "bays" where the operators can have the crops to hand without having to move around inside the entire modular system.

The reduction of the spaces due to human access allows even more in-depth optimization of the volume used for farming, hence drastically reducing the use of self-propelled means that are sometimes hazardous to the safety of operators, it being necessary to reach heights of a number of metres. In the event of the systems proposed herein the current height limit for each individual module can be raised to higher values as human intervention at height is no longer necessary.

As already mentioned, the possibility is also envisaged of completely removing a determined tray containing the products both for seeding and harvesting purposes and they can be conveyed to other destinations also through self-propelled means, such as trucks, or the like.

The invention has been described in the foregoing with reference to a preferential embodiment thereof. However it is clear that the invention is susceptible to numerous variants which fall within the scope thereof, and which are technically equivalent.

The invention claimed is:

1. An automatic and modular system for handling trays used for containing plants or the like to be grown through hydroponic, aeroponic, or aquaponic farming, the system comprising:

a first module having a quadrangular plan and a vertical arrangement delimited by one or more vertical supports, the first module including at least two lateral zones, each lateral zone including a plurality of substantially horizontal and overlapping supporting seats or guides for one or more trays, and a central zone in which a vertical transfer device operates slidably along a vertical axis by a moving element activated by motorized assemblies able to translate the vertical transfer device from a lowered position to a raised position to be in correspondence with each of the one or more trays and vice versa, the vertical transfer device including a resting shelf for supporting a respective tray of the one or more trays and having a plurality of openings, and with a horizontal transfer means running the respective tray along a first horizontal axis from and towards a respective seat provided inside one of the lateral zones, wherein the first module further includes a plurality of motorized rollers adapted to be intercepted by the plurality of openings of the resting shelf when the vertical transfer device is in the lowered position and adapted to be separate from the vertical transfer device when the vertical transfer device is in the raised position and arranged in the central zone in which the vertical transfer device operates and is configured to take a respective tray of the one or more trays when the respective tray is located on the resting shelf of the vertical transfer device and displace the respective tray by the plurality of motorized rollers along a second axis horizontal and orthogonal to the first horizontal axis to perform a direct transfer of the respective tray towards another resting shelf of another vertical transfer device of a second module arranged alongside and coupled to the first module.

2. The system of claim 1, further comprising a plurality of further modules arranged adjacent to each other and interconnected so that at least two of them are aligned along the first or the second horizontal axis.

3. The system of claim 2, wherein the handling of a movement of the one or more trays is controlled by an electronic control unit that controls a movement of the vertical transfer device pertaining to each of the plurality of further modules and of one or more horizontal transfer devices pertaining to each module and connecting adjacent modules.

4. The system of claim 1, wherein each module is square shaped and wherein each of the lateral zones and the central zone have substantially the same plan dimensions.

5. The system of claim 1, further comprising a device cooperating between the seats or guide of adjacent modules configured to move a tray from a lateral zone of a module to a lateral zone of an adjacent module along the first horizontal axis.

6. The system of claim 5, wherein the device includes a pair of motorised belts opposing and parallel to each other arranged between respective lateral zones of adjacent modules.

7. The system according to claim 1, wherein at least one of the plurality of further modules comprises lighting or irrigation means or elements suitable for development of the plants.

8. The system of claim 7, wherein each module of the plurality of modules is split into different overlapping zones, each of which deals with different or uniform functions for the development of the plants contained in the one or more trays.

9. The system of claim 8, wherein the one or more trays are positioned inside each module in a plurality of different zones having different functions, wherein at least one zone is free from lighting and shielded for subjecting the plants to a night-time simulation condition, at least one zone includes a lighting means used for a simulation of daytime and solar radiation for photosynthesis, and at least one zone includes an irrigation means.

10. The system of claim 8, wherein each module is positioned in the system in a plurality of different zones having different functions, wherein at least one zone is free from lighting and shielded for subjecting the plants to a night-time simulation condition, at least one zone includes a lighting means used for a simulation of daytime and solar radiation for photosynthesis, and at least one zone includes an irrigation means.

11. The system of claim 8, wherein one or more zones are used for seeding which can be diversified based on different types of plants.

12. The system of claim 1, wherein a movement of the one or more trays is handled and driven by an electronic control unit or by an information system provided with memory in which one or more seeding coordinates of individual plant products and a physical position of the individual plant products are recorded as arranged on an individual tray.

13. The system of claim 12 further comprising one or more cameras, allocated in a zone of one or more modules configured to record a state of the plant products in the one or more trays by sending data to the information system that processes a state of each plant, compares it with previously recorded images of the plant products with similar characteristics, and assesses their state of health to optimize a growth process of the individual plant products.

14. The system of claim 1, wherein the moving element comprises one or more pulley belts or chains to translate the vertical transfer device along the vertical axis.

15. The system of claim 1, wherein the plurality of motorized rollers are arranged to face an inside surface of the resting shelf.

16. The system of claim 1, wherein the plurality of motorized rollers extend transversely across the resting shelf and are configured to extend through the plurality of openings to exceed a height of an outer surface of the resting shelf.

17. The system of claim 1, wherein the plurality of motorized rollers are configured to lower through the plurality of openings below a height of an outer surface of the resting shelf.

18. The system of claim 1, wherein the plurality of motorized rollers rotate in sync to displace the respective tray from the first module to the second module.

* * * * *